United States Patent
Buringer (10) Patent No.: US 6,221,220 B1
(45) Date of Patent: Apr. 24, 2001

(54) PORTABLE DEVICE FOR DEIONIZING LIQUIDS

(76) Inventor: Hans Buringer, P.O. Box 2395, Beverly Hills, CA (US) 90213

( * ) Notice: Subject to any disclaimer, the term of this patent is extended or adjusted under 35 U.S.C. 154(b) by 0 days.

(21) Appl. No.: 09/224,630

(22) Filed: Dec. 30, 1998

Related U.S. Application Data (63) Continuation-in-part of application No. 09/000,993, filed on Dec. 30, 1997, now Pat. No. 6,042,705.

(51) Int. Cl.[7] .................................................. C25B 9/00
(52) U.S. Cl. ................ 204/271; 204/282; 204/290.11; 204/291
(58) Field of Search ............................... 204/271, 290.01, 204/290.11, 291, 282

(56) References Cited

U.S. PATENT DOCUMENTS

| | | | |
|---|---|---|---|
| 512,970 | * | 1/1894 | Johanson ............................ 204/271 |
| 1,217,643 | * | 2/1917 | Schneider ........................... 204/271 |
| 1,446,029 | * | 2/1923 | Beidler ............................... 204/271 |
| 2,042,534 | * | 6/1936 | Krause ................................ 204/271 |
| 4,769,119 | * | 9/1988 | Grundler ............................. 204/149 |
| 5,584,981 | * | 12/1996 | Turner et al. ...................... 204/536 |

* cited by examiner

Primary Examiner—Kathryn Gorgos
Assistant Examiner—Thomas H Parsons
(74) Attorney, Agent, or Firm—Sanford Astor (57) ABSTRACT

A self-contained, portable device for decomposing ions present in a liquid includes a housing shaped to be held within a human hand; a source of electric current; an anode that is comprised of an inert material, attached to the housing and in electrical communication with the source of electric current; a cathode that is comprised of an inert material, attached to the housing and in electrical communication with the source of electric current; and a switch for electrically connecting the anode, the cathode and the source of electric current.

9 Claims, 5 Drawing Sheets

PORTABLE DEVICE FOR DEIONIZING LIQUIDS

This is a continuation-in-part of U.S. patent application Ser. No. 09/000,993, filed Dec. 30, 1997 (now U.S. Pat. No. 6,042,705) filed Mar. 28, 2000, the disclosure of which is incorporated in its entirety herein by reference.

FIELD OF THE INVENTION

The present invention relates to a device which can be easily transported, manually held and operated and which is used to decompose or remove ions such as sulfites present in a liquid, such as wine.

BACKGROUND OF THE INVENTION

Ionic substances, such as sulfites, are added to various beverages such as wine and can be found in other beverages such as fruit juices and beer. Sulfites provide an antioxidant function which helps to preserve the freshness of the beverages to which it is added. However, sulfites can and do cause moderate to severe allergic reactions, including anaphylactic shock, which can be life-threatening, in a non-trivial percentage of the human population. Therefore, while it is desirable that sulfites be used to preserve the freshness of beverages, it is also desirable to be able to decompose sulfites present in a beverage just prior to consumption of the beverage by a person who is or may be allergic to sulfites.

Accordingly, the present invention was developed to allow a person to carry a small device with them, for example as one would carry a pen, which the person can use to decompose or remove ions, such as sulfites, present in a beverage which might contain sulfites immediately before drinking the beverage.

BRIEF SUMMARY OF THE INVENTION

In accordance with one aspect of the present invention, there is provided a self-contained, portable device for decomposing (i.e., reducing or oxidizing) ions present in a liquid.

The device includes a housing shaped to be held within a human hand; a source of electric current; an anode that is comprised of an inert material, attached to the housing and in electrical communication with the source of electric current; a cathode that is comprised of an inert material, attached to the housing and in electrical communication with the source of electric current; and a switch for electrically connecting the anode, the cathode and the source of electric current.

In accordance with another aspect of the present invention, there is provided a self-contained, portable device for removing ions from a liquid including a housing shaped to be held within a human hand; a source of electric current; an anode that is comprised of an inert material, attached to the housing and in electrical communication with the source of electric current, the anode having a surface on which a layer of a material that is reactive with an anion is disposed; a cathode that is comprised of an inert material, attached to the housing and in electrical communication with the source of electric current, the cathode having a surface on which a layer of a material that is reactive with a cation is disposed; and a switch for electrically connecting the anode, the cathode and the source of electric current.

In accordance with an additional aspect of the present invention, there is provided a method of decomposing ions present in a liquid. The method includes the steps of contacting a container containing the liquid with a device including a housing shaped to be held within a human hand, a source of electric current, an anode that is comprised of an inert material, attached to the housing and in electrical communication with the source of electric current, a cathode that is comprised of an inert material, attached to the housing and in electrical communication with the source of electric current, and a switch for electrically connecting the anode, the cathode and the source of electric current; activating the anode and cathode by activating the switch; and contacting ions present in the liquid with at least one of the anode and the cathode for a time sufficient to decompose at least a portion of the ions.

In accordance with still another aspect of the present invention, there is provided a method of removing ions present in a liquid. The method includes the steps of contacting a container containing the liquid with a device including a housing shaped to be held within a human hand, a source of electric current, an anode that is comprised of an inert material, attached to the housing and in electrical communication with the source of electric current, the anode having a surface on which a layer of a material that is reactive with an anion is disposed, a cathode that is comprised of an inert material, attached to the housing and in electrical communication with the source of electric current, the cathode having a surface on which a layer of a material that is reactive with a cation is disposed, and a switch for electrically connecting the anode, the cathode and the source of electric current; activating the anode and cathode by activating the switch; contacting ions present in the liquid with at least one of the anode and the cathode for a time sufficient to cause at least a portion of the ions to react with and bind to at least one of the reactive materials disposed on the anode and the cathode; and removing the anode and cathode of the device from contact with the liquid.

Other objects, features and advantages of the present invention will become apparent to those skilled in the art from the following detailed description. It is to be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The invention may be more readily understood by referring to the accompanying drawings in which.

Like numerals refer to like parts throughout the several views of the drawings.

DETAILED DESCRIPTION OF THE PREFERRED EMBODIMENTS

Figure 1:
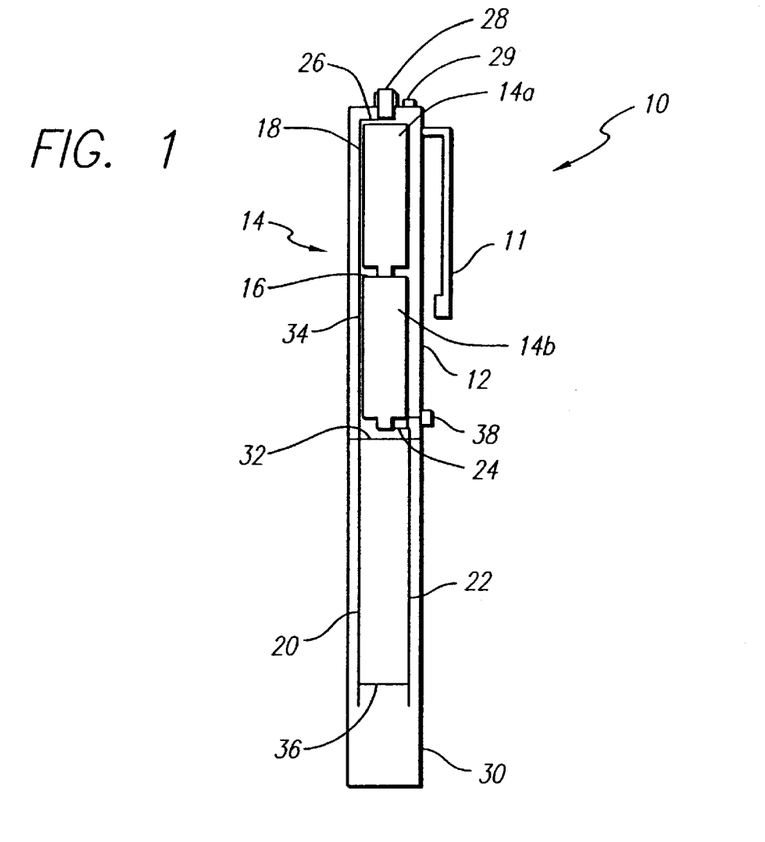
FIG. 1 is a schematic cross-sectional view of one embodiment of a deionizing device of the present invention.

As depicted in FIG. 1, liquid deionizing device 10 includes an upper housing 12 which is preferably shaped to be easily graspable by a human hand. In the particular embodiment depicted, upper housing 12 is configured to resemble and function as the top portion of a pen such as a two piece ball point pen. It is to be understood that other shapes are within the scope of the present invention. Upper housing 12 can be formed of, for example, wood, plastic, metal and combinations thereof. Upper housing 12 is preferably about 4 cm to about 8 cm in length and about 1 cm in diameter.

Liquid deionizing device 10 is suitable for use with any non-corrosive liquids. Device 10 is most preferably suited for use with beverages which may contain objectionable ionic substances, for example, sulfur dioxide and sulfites such as sodium sulfite, sodium bisulfite, potassium bisulfite, sodium metabisulfite, potassium metabisulfite (potassium pyrophosphite) and the like. As previously mentioned, sulfites are added to various beverages such as wine and can be found in other beverages such as fruit juices and beer. Sulfites provide an antioxidant function which helps to preserve the taste and freshness of the beverages to which it is added. However, sulfites can and do cause moderate to severe allergic reactions, including anaphylactic shock, which can be life-threatening, in a non-trivial percentage of the human population. Device 10 allows a consumer of a beverage which may contain objectionable ionic substances, such as sulfites, to decompose those substances prior to consuming the beverage. In this regard, device 10 is available in at least two embodiments. In one embodiment, device 10 is to be used to deionize a beverage in an person's glass. The person inserts a portion of device 10 in a liquid in their glass, activates a switch, leaves the portion of device 10 in the liquid in the glass for a period of time, removes the portion of device 10 from the liquid and then deactivates the switch. Alternatively, the person could engage the edge of the glass with, for example, lip 11 so that the anode and cathode are positioned in the liquid.

Preferably, the person swirls the liquid about gently, with slow, circular stirring with changes in direction, to introduce fresh liquid to the surface of the anode and cathode. Swirling prevents localized ion buildup.

In an alternative embodiment, device 10 is to be used to deionize the contents of a bottle, such as a wine bottle. The embodiment described above could be used for this purpose, although, the portion of device 10, namely, an anode and a cathode, as described in more detail below, inserted into the liquid, would typically be longer than those provided in device 10 for use in an individual glass. Preferably, device 10 for use in a bottle includes a bottle engaging portion which securely positions it in the bottle. For example, this portion could include a portion which attached to the bottle, and particularly which could be inserted in the orifice of the bottle as a wine bottle cork shaped body from which the anode and cathode depend. Alternatively, a frame which held device 10 and surrounded the bottle and was stabilized by the surface on which the bottle was placed could be used.

Device 10 includes a source of electric current 14, which provides current to anode 20 and cathode 22. In the embodiment depicted current source 14 comprises batteries 14a and 14b connected in series. The current source can be direct or alternating, however, it is preferable that the current supplied to anode 20 and cathode 22 be direct current, for reasons described below with respect to the function of the device. When current sources such as batteries are used, direct current is supplied without the use of any additional apparatus. If an alternating current source, such as wall current, is used, it is preferable to use an AC to DC converter (not shown) that may include a rectifier to convert the current from AC to DC. Other sources of current such as solar cells, which can be included on device 10, are within the scope of the invention. The current supplied is preferably supplied at a voltage which allows for decomposition of at least 95%, more preferably at least 99% and even more preferably substantially 100% of the ions in a liter or less of the liquid in about 5 to about 10 seconds but which does not increase the temperature of the liquid by more than about 5 degrees C. Voltages which can meet these criteria are between about 2.92V and about 24V, preferably about 2.92V and about 12V. If wall current is used a step-down transformer (not shown) can provide current in the specified voltage ranges. Batteries are available which, alone or in combination, will supply the specified voltage ranges. Batteries can be arranged in series or in parallel.

Anode 20 is electrically connectable to the positive end 18 of current source 14a through contact portion 26. Anode 20 can preferably be attached to upper housing 12 through plate 32 which is formed of an electrically non-conducting material. Plate 32 is disposed in housing 12 and retained therein by adhesives or mechanical means such as threads disposed on an edge of plate 32 which engage corresponding threads on the inside of upper housing 12. The plate 32 can be replaced with a longer threaded connector 33 as shown on FIG. 4. Upper portion 12 can be threadingly connected to connector 33, and lower portion 30 can also be threadingly connected to connector 33 or can be snap fitted, like a pen. Alternatively or additionally, anode 20 can be attached to upper housing 12 through anode retainer portion 34. Anode retainer portion 34 can provide, for example, a slot or a groove which the anode can engage. Alternatively, anode 20 can be adhered directly to an inside surface of upper housing 12.

Anode 20 is connected to the positive end 18 of battery 14a through connecting portion 26. Anode 20 is positively charged and accordingly attracts negatively charged ions known as anions. Representative anions which anode 20 can attract and which are commonly found in beverages include sulfites such as $SO^{-2}$, $S_2O_5^{-2}$ and $SO_3^{-2}$.

Anode 20 is formed of a preferably inert material, more preferably a metal, which term includes alloys, which conducts electricity. By inert material is meant that as current flows through anode 20, ions of the material which are undesirable to a drinker of the liquid are not liberated into a liquid in which anode 20 is immersed. Examples of materials suitable to form anode 20 are metals with negative emf (electromotive force). Exemplary metals having negative emf are platinum, gold, silver and copper, combinations thereof and alloys thereof. A particularly preferred material is platinum-plated titanium. Use of metals with negative emf prevents plating out. Another suitable material is graphite. However, it is to be understood that other materials which are electrically conductive and are preferably non-ionizable, such as metals, conducting resins and polymers with or without metal groups, are within the scope of the present invention.

Anode 20 is preferably formed from a wire thick enough to provide some rigidity and decrease the likelihood of breakage of the anode in normal usage, and to decrease the resistivity of the anode below that required for adequate usage of the anode. Anode 20 can be preferably from about 0.1 mm to about 2 mm in thickness and more preferably from about 0.5 mm to about 1 mm in thickness. Anode 20 can have a circular or a non-circular, e.g., hexagonal or flat oblong, cross-section.

In a more particular embodiment, anode 20 is formed so as to increase the surface area of anode 20 to maximize the number of sites of ionic attraction between the anode and anions in solution in a liquid in which the anode is immersed. The surface area of anode 20 can be increased in a number of ways, which can be used alone or in combination. The metal forming anode 20 can have scratches and/or indentations and/or protrusions formed on its surface, thereby increasing the surface area per unit length of anode 20. These surface features can be obtained by, for example, acid washing or sanding the surface of the metal forming the anode. Anode 20 can be coiled in the form of a helix which also increases the surface area per linear unit of anode 20. The diameter of the helical coil of anode 20 is preferably from about 0.5 mm to about 3 mm and more preferably from about 1.0 mm to about 1.5 mm. The helix is preferably tightly coiled to further increase the surface area of the anode per unit length of the anode. However, it is preferable that the helix not be so tightly coiled that there is no space between adjacent coils, as this will decrease the surface area of anode 20 and restrict the flow of liquid around and through the coiled anode.

The length of the anode from the point of its insertion at plate 32 to its other end is preferably from about 1 cm to about 20 cm, and more preferably from about 5 cm to about 10 cm. If anode 20 is a coiled anode, then the uncoiled length of anode 20 is preferably from about 6 cm to about 120 cm and more preferably from about 30 cm to about 60 cm. The anode can also be telescopic or hinged. In this embodiment, the fully extended length preferably is a maximum of about 10 cm.

Cathode 22 is connected to negative end 16 of battery 14b, preferably through cathode connecting portion 24. Portion 24 is formed of a conductive material, preferably metal, for example copper, nickel, iron, combinations thereof and alloys thereof. Portion 24 also attaches cathode 22 to upper housing 12. Cathode 22 is negatively charged and accordingly attracts positively charged ions known as cations. Representative cations which cathode 22 can attract and which are commonly found in beverages include $K^+$ and $Na^+$.

Cathode 22 is formed of a preferably non-ionizable material, more preferably a metal, which term includes alloys thereof, which conducts electricity. By non-ionizable material is meant that as current flows through cathode 22, ions of the are not transferred to a liquid in which cathode 22 is immersed. Examples of materials suitable to form cathode 22 include platinum-plated titanium, gold, silver, copper, nickel, nickel-plated iron and chromium-plated iron. However, it is to be understood that other metals which are electrically conductive and are preferably non-ionizable are within the scope of the present invention.

Cathode 22 is preferably formed from a wire or rod thick enough to provide some rigidity and decrease the likelihood of breakage of the anode in normal usage, and to decrease the resistivity of the anode below that required for adequate usage of the anode. Cathode 22 can be preferably from about 0.1 mm to about 2 mm in thickness and more preferably from about 0.5 mm to about 1 mm in thickness. Cathode 22 can have a circular or a non-circular (e.g., hexagonal or flat oblong) cross-section. Flat oblong cathodes can preferably have dimensions 2–3 mm by 0.1–1 mm by 10 cm max. Preferably, cathode 22 is formed so as to increase the surface area of cathode 22 to maximize the surface for plating between the cathode and cations in solution in a liquid in which the cathode is immersed.

The surface area of cathode 22 can be increased in a number of ways, which can be used alone or in combination. The metal forming cathode 22 can have scratches and/or indentations and/or protrusions formed on its surface, thereby increasing the surface area per unit length of cathode 22. These surface features can be obtained by, for example, acid washing or sanding the surface of the metal forming the anode. Preferably, cathode 22 is coiled in the form of a helix which also increases the surface area per linear unit of cathode 22. The diameter of the helical coil of cathode 22 is preferably from about 0.5 to about 3 mm and more preferably from about 1.0 mm to about 1.5 mm. The helix is preferably tightly coiled to further increase the surface area of the anode per unit length of the anode. However, it is preferable that the helix not be so tightly coiled that there is no space between adjacent coils, as this will decrease the surface area of cathode 22 and restrict the flow of liquid around and through the coiled cathode.

The length of the cathode from its point of insertion in portion 24 to its other end is typically the same as the anode, and thus preferably about 1 cm to about 20 cm, and more preferably from about 5 cm to about 10 cm. If cathode 22 is a coiled cathode, then the uncoiled length of cathode 22 is preferably from about 6 cm to about 120 cm and more preferably from about 30 cm to about 60 cm. The cathode 22 can also be telescoped or hinged, as with the anode 20, in which case the preferred maximum extended length is about 10 cm.

The distance between anode 20 and cathode 22 in particular embodiments is from about 1 mm to about 10 mm and more preferably from about 2 mm to about 6 mm. A connector 36, which is preferably non-conducting can be used to strengthen anode 20 and cathode 22.

Figure 2:
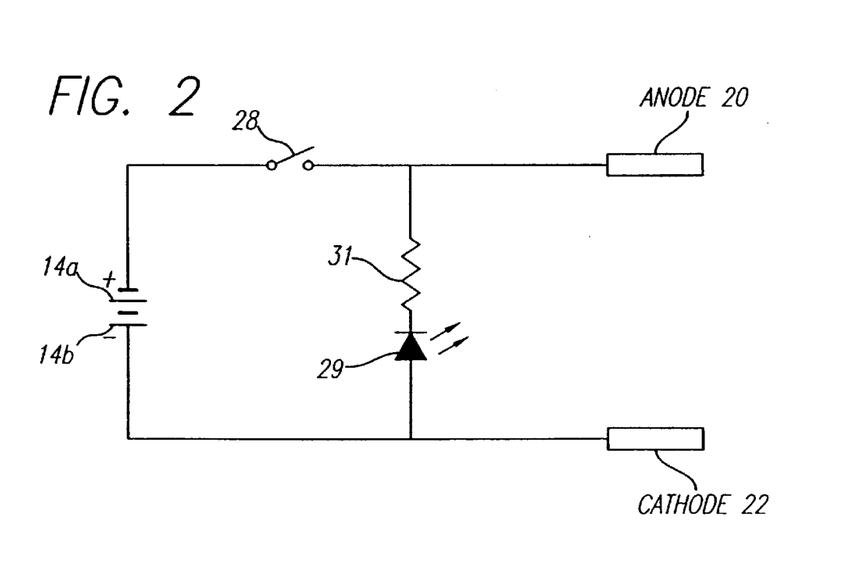
FIG. 2 is a circuit schematic of the electronic circuitry in an embodiment of the invention.

The circuit between the anode 20, batteries 14a, 14b, and the cathode 22 shown in FIG. 2 can be completed by switch 28. Switch 28 can be activated by flipping the switch to the on position as in a toggle type of switch which is then inactivated by flipping the switch to the off position. Alternatively, a pressure sensitive switch can be used. The pressure sensitive switch can be activated by the constant application of pressure and inactivated when the pressure is removed. Alternatively, the pressure sensitive switch can act as a push button switch which is activated by an initial application of pressure and inactivated by a subsequent application of pressure. Alternatively, a sliding switch can be used. Light sensitive switches can be used which activate or inactivate in response to an increase or decrease in an amount of light reaching the switch. Other switch means for opening and closing an electrical circuit are within the scope of the invention. Electrically, switch 28 can be placed at any point in the circuit between the anode the source of current and the cathode shown in FIG. 1. From a mechanical standpoint, switch 28 is placed on upper housing 12 shown in FIG. 1.

In a preferred embodiment of the invention, the device further includes a human sensible indicator of electrical current flow to indicate when the device is turned on or off. The human sensible indicator of electrical current flow can include a light, or an LED 29 with an optional current limiting resistor 31 as shown in FIG. 2. Alternatively, or additionally, the indicator can include a position indicator of the switch 28 which either visually or through feel indicates if the switch is in the on or off position. Alternatively, the LED can be the switch 28 itself.

Removable lower housing 30 is preferably included to protect anode 20 and cathode 22. Lower housing 30 engages upper housing 12. Lower housing 30 can engage upper housing 12 by fitting within the interior of upper housing 12 or fitting about the exterior of upper housing 12. Lower housing 30 can engage upper housing 12 through, for example, a threaded engagement or through a friction fit. Lower housing 30 can be formed of, for example, wood, plastic, metal and combinations thereof.

Device 10 optionally includes a clip 38 affixed to upper housing 12.

Device 10 can be used to deionize a liquid as follows: The user carries device 10 for example, in a shirt pocket. Upon being served a glass of a liquid such as wine at a restaurant or other location, the user removes the device from his or her pocket, removes lower housing 30, if so provided, and inserts anode 20 and cathode 22 into the liquid.

The switch can be activated before the anode and cathode are inserted into the liquid or after. The anode and cathode are left in the liquid for a period of time which depends on the voltage of the current supplied. Generally, the higher the voltage the less the period of time required to decompose the ions present in the liquid. Preferably, the voltage supplied allows for extraction of, for example, sulfites in a glass of wine from a level of about 40 ppm to about 800 to a level of less than 10 ppm in about 5 to about 10 seconds. The voltage used will not heat the liquid to a point at which its sense characteristics such as taste and smell are affected or which will spoil the experience of consuming the beverage. For example, a chilled white wine should not be heated to room temperature in the time it takes to decompose the ions present therein.

Device 10 once inserted in the liquid with the switch closed operates as follows: Battery 14*a* causes electrons to flow away from anode 20 and into cathode 22. The negatively charged cathode 22 attracts the positive cations of the dissociated electrolytes. Electrons then flow from the cathode 22 to the cations. The cations become neutral after receiving the electrons from the cathode 22; this is the reduction half-reaction. At the anode 20, conversely, the negative anions donate electrons to become neutral; this is the oxidation half-reaction. Both half-reactions, which constitute the complete redox reaction, decompose ions into non-ionic, neutral materials. The ions, that is, are not removed from the liquid, but are converted into non-ionic materials, i.e., decomposed. In the redox reaction, Na or K will not deposit on the cathode if the emf voltage is below 4.28V.

It is important that the current not be turned off while the anode and cathode are in the liquid or the ions will begin to migrate back into the liquid. In that regard the on/off indicator 29 allows a person to determine when to turn device 10 on and off. For this reason, it is also preferred that the current ultimately provided to the anode and the cathode be direct current. If alternating current is used, it is possible that the ions in a liquid will migrate to and then from the anode and cathode, thereby completely or significantly reducing the effectiveness of device 10 in decomposing ions present in the liquid.

Figure 3:
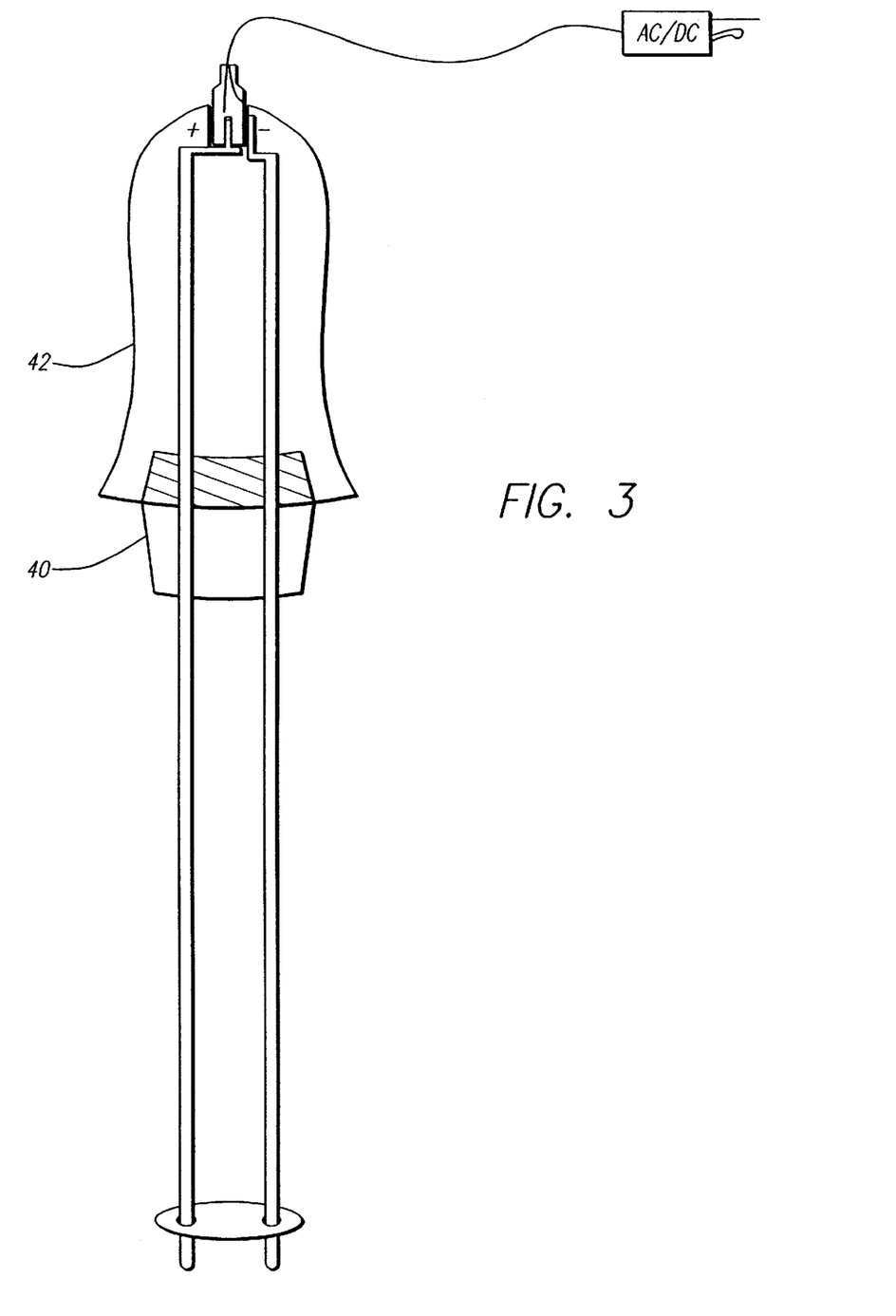
FIG. 3 is a view of another embodiment of the present invention showing the deionizing device and a bottle collar.

With reference to FIG. 3, there is shown an embodiment of the present invention which include collar 40 which is made of rubber, cork, plastic or like material and which is in the shape of a normal wine bottle cork. Passing snugly through the collar 40 are the electrodes. Preferably, the collar is made from a soft plastic similar to the covering of a steering wheel, such as polyurethane. In use, the device is placed into a freshly opened bottle of wine or other liquid to be treated, and the collar is wedged into the opening of the bottle. The device is then activated, and then removed whereby the sulfites in the wine or liquid as the case may be are substantially decomposed. A handle 42 can also be provided, as well as AC/DC adaptor 44. The handle can be made out of rubber, hard plastic, wood or the like.

Figure 4:
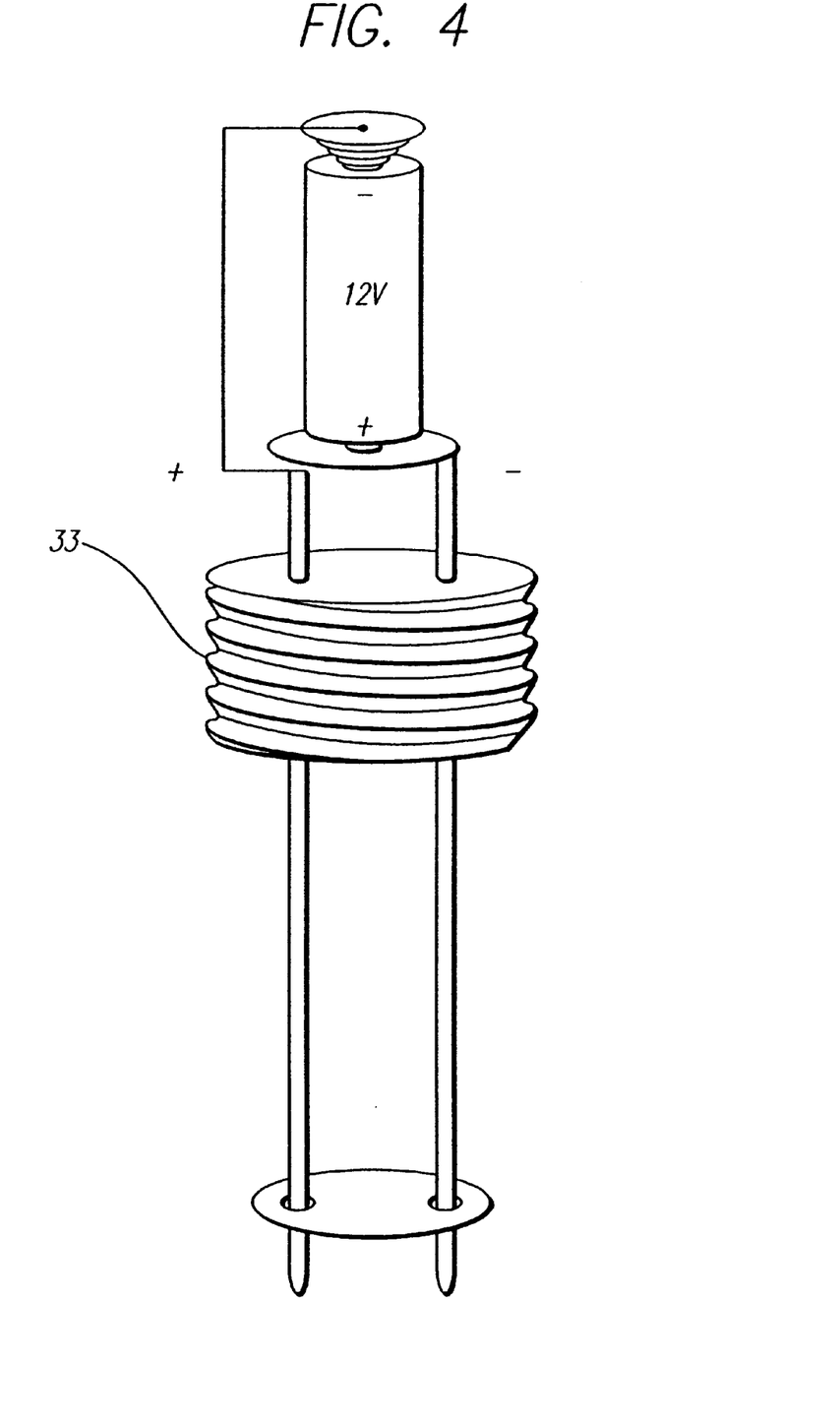
FIG. 4 is a view of another embodiment of the present invention showing the deionizing device adaptable to a threaded cap and body (switch not shown).

With reference to FIG. 4, there is shown another embodiment of the present invention which is adaptable to a threaded cap and body.

In accordance with another aspect of the invention, layers of materials that are respectively reactive with anions and cations present in the liquid are disposed on the surfaces of the anode 20 and cathode 22, respectively. As a result of this reactivity, the anode 20 and cathode 22 remove the target anions and cations, respectively, from the liquid.

According to a particular embodiment, at least a portion of the surface of the cathode 22 is coated with a material, such as a synthetic resin, that includes at least one acidic functional group —RCOOH (wherein R is a bond or a group linking the carboxyl group to the remainder of the resin). Preferably the resin is stable in the liquid to be treated, that is, the carboxyl group is not removed from the resin when the resin is in contact with the liquid. Exemplary resins include methacrylate resins.

The anode 20 is coated with another material, such as a second synthetic resin, that includes at least one functional basic group, for example a substituted ammonium hydroxide group —R(NH$_3$)$^+$(OH)$^-$ (wherein R again is the remainder of the resin). This resin also preferably is stable in the liquid to be treated. Exemplary resins for use in coating the anode include olefin resins such as Nafion®.

The acidic group reacts with anions in the solution, such as K$^+$ or Na$^+$:

As a result, hydrogen ions are released into the liquid. Once released into the liquid, the hydrogen ions react with the hydroxyl groups of the anode, forming water:

At this point, cations in the liquid, such as SO$_3^{-2}$, react with the remaining ammonium groups of the anode. The complete reaction for SO$_3^{-2}$ is:

Substantially all ions can be removed from the liquid in this manner and remain attached to the cathode and anode.

The cathode can be regenerated by dipping into a moderately concentrated hydrogen ion solution. The anode can be regenerated by dipping into a moderately concentrated hydroxide solution.

The anions and cations are attracted to their respective electrodes due to the flow of the electric current from the battery. This motion of the anions and cations results in increased flow of the liquid around the electrodes, which can be accompanied by additional gentle stirring during use.

In a preferred embodiment, the electrodes are surrounded by a perforated sleeve, with grains of the selected resins being packed between the electrodes and the sleeve. The sleeve perforations are sized to be slightly smaller than the grains of the resins; conversely, the grain size can be selected to be slightly larger than the size of the sleeve perforations.

Preferably, the electrodes are made from 99.9% titanium and are platinum coated. The cylinders preferably are made from a material that is resistant to hydrogen ions and hydroxide ions in solution, such as a plastic.

Figure 5A:
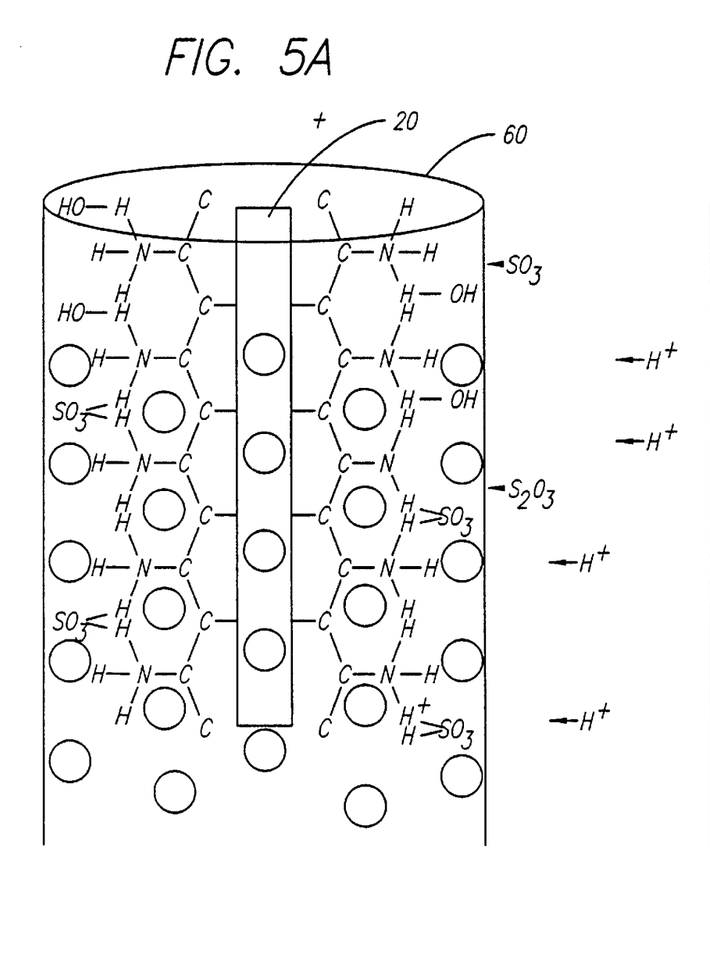
FIGS. 5a–b are schematic illustrations of an anode and cathode according to an alternative embodiment of the invention, which are surrounded by perforated sleeves and include packed layers of granular, reactive synthetic resins.
Figure 5B:
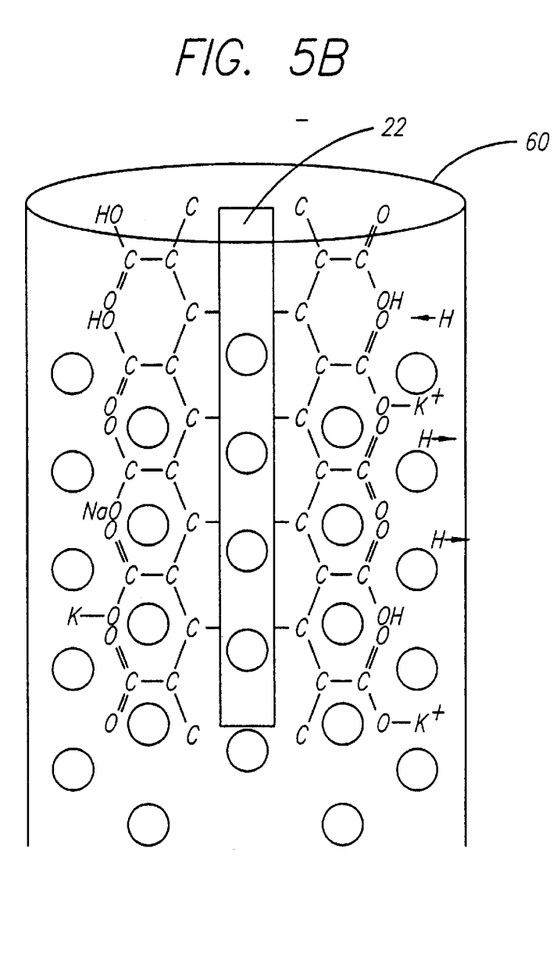

Referring to FIGS. 5a–b, anode 20 is surrounded by sleeve 60 with perforations 62. Between sleeve 60 and anode 20 is a layer of a packed granular synthetic resin having a reactive ammonium hydroxide functional group. Sulfite ions react the synthetic resin and are bound to the resin, and thus are removed from the liquid. Likewise, cathode 22 is surrounded by sleeve 60. Between sleeve 60 and cathode 22 is a layer of another packed granular synthetic resin having a reactive acid functional group. Sodium and potassium ions react with the synthetic resin and are bound thereto, and thus are removed from the liquid.

Alternatively, the selected resins can be coated on the surfaces of the electrodes.

When resins, such as packed granular resins, or coatings are employed as described above, preferably the electrodes are configured such that their surface areas are increased. Thus, for example, coiled electrodes are usefully employed in a preferred embodiment of the invention.

Figure 6:
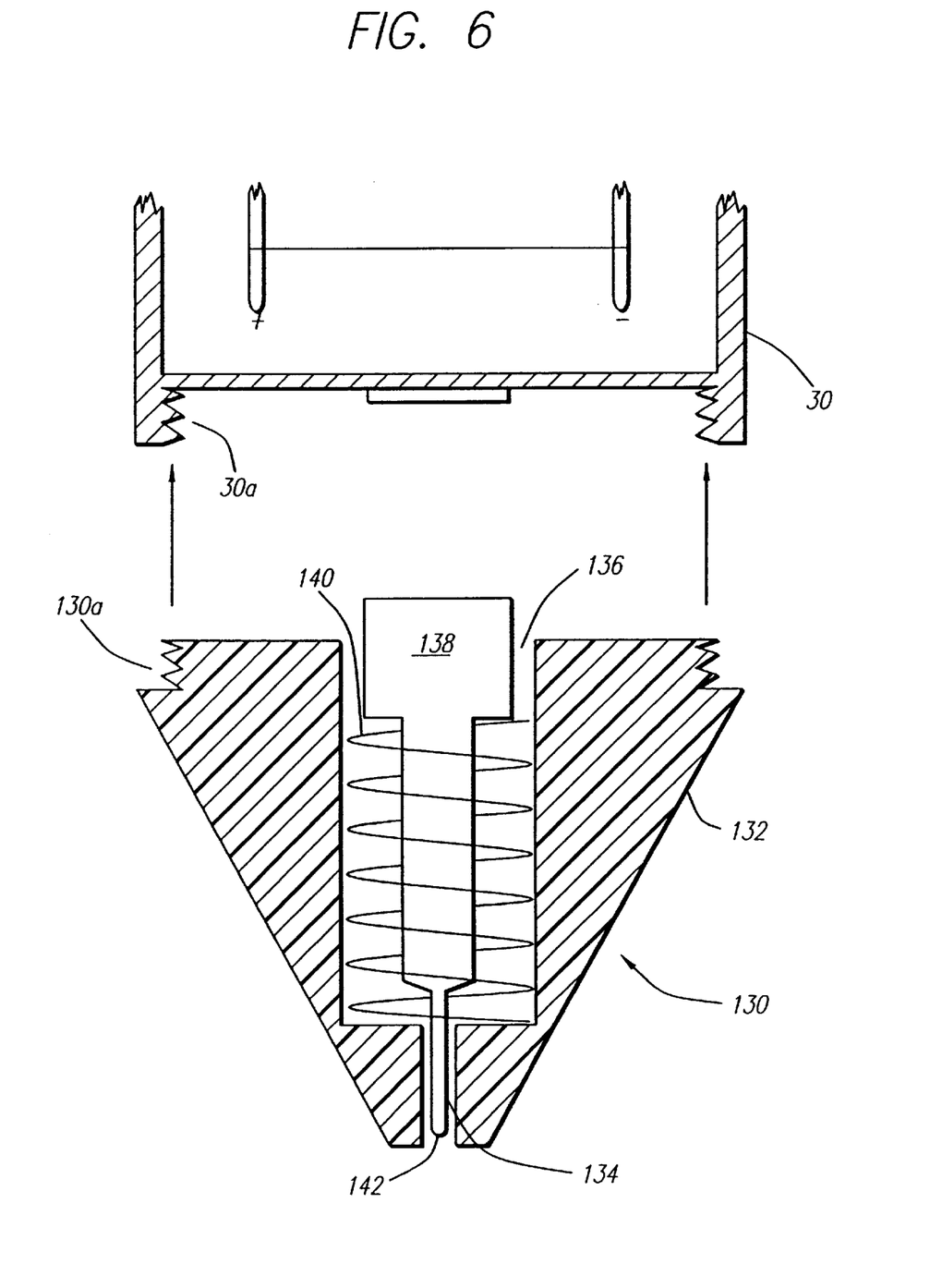
FIG. 6 is a schematic cross-sectional view of a modification of the embodiment of FIG. 1 which functions both as a deionizing device and as a writing instrument.

In FIG. 6 a modification of the embodiment of FIG. 1 includes writing mechanism 130 which is secured to housing 30 of device 10. Writing mechanism 130 can be secured to housing 30 by any desired means, such as threads 30a and 130a (as illustrated), by other mechanical means such as snaps or friction fittings, by adhesives, etc. Writing mechanism 130 includes a housing 132, which can have any desired length, for example about 30 mm. Housing 132 has defined therein a bore 134 leading to a chamber 136. Within chamber 136 are disposed a cartridge 138 (preferably refillable or replaceable) which is urged upward by spring 140. When writing mechanism 130 is secured to housing 30, the ball point 142 of cartridge 138 is urged through bore 134 for use in writing.

Writing mechanism 130 is not limited to a ball point device as illustrated, but can include a felt tip, a pencil lead, and the like. If desired, the writing mechanism can also include a cap that covers bore 134.

What is claimed is:

1. A portable device for removal of sulfites from beverages comprising
   a) a cylindrical housing;
   b) a source of electric current; and
   c) a cathode coated with material including acidic functional groups; and
   d) an anode coated with material including basic functional groups for removal of sulfite ions.

2. The portable device for removal of sulfites from beverages of claim 1 in which the material used to coat at least one of said anode or cathode is an ion exchange resin.

3. The portable device for removal of sulfites from beverages of claim 2 further comprising a perforated sleeve that surrounds the ion exchange resin.

4. The portable device for removal of sulfites from beverages of claim 2 wherein the holes in the perforated sleeve are smaller than the grains of the resin.

5. The portable device for removal of sulfites from beverages of claim 1 in which the basic functional group is a substituted ammonium hydroxide.

6. The portable device for removal of sulfites from beverages of claim 1 in which the acidic group is a substituted carboxylic acid.

7. A portable device for removal of sulfite ions from beverages comprising:
   a) a cylindrical housing;
   b) a source of electric current;
   c) an anode for removal of sulfite ions, the anode comprising a metal selected from the group consisting of platinum, gold, silver, and copper and platinum plated titanium, or comprising graphite;
   d) a cathode formed of non-ionizable material selected from the group consisting of gold, silver, copper, nickel, nickel-plated iron, chromium-plated iron and platinum-plated titanium;
   e) a writing mechanism secured thereto.

8. A portable device for removal of sulfites from beverages comprising:
   a) a cylindrical housing;
   b) a source of electric current; and
   c) a cathode coated with material including acidic functional groups;
   d) an anode coated with material including basic functional groups for removal of sulfite ions; and
   e) a writing mechanism secured thereto.

9. A portable device for removal of sulfite ions from beverages comprising:
   a) a cylindrical housing;
   b) a source of electric current;
   c) an anode for removal of sulfite ions, the anode comprising a metal selected from the group consisting of platinum, gold, silver, and copper and platinum plated titanium, or comprising graphite;
   d) a cathode formed of non-ionizable material selected from the group consisting of gold, silver, copper, nickel, nickel-plated iron, chromium-plated iron and platinum-plated titanium;
   e) a cover in the form of a pen.

* * * * *